United States Patent [19]

Miller

[11] 4,154,256
[45] May 15, 1979

[54] SELF STABILIZING SONIC INLET

[75] Inventor: Brent A. Miller, Olmsted Falls, Ohio

[73] Assignee: The United States of America as represented by the Administrator of the National Aeronautics and Space Administration, Washington, D.C.

[21] Appl. No.: 891,244

[22] Filed: Mar. 29, 1978

[51] Int. Cl.² ............................................. B64D 33/02
[52] U.S. Cl. .................................. 137/15.1; 244/53 B
[58] Field of Search ............................. 137/15.1, 15.2; 244/53 B, 53 R

[56] References Cited

U.S. PATENT DOCUMENTS

| | | | |
|---|---|---|---|
| 2,864,236 | 12/1958 | Toure | 137/15.1 |
| 3,123,285 | 3/1964 | Lee | 137/15.1 UX |
| 3,524,458 | 8/1970 | Goldsmith | 137/15.1 |

*Primary Examiner*—Alan Cohan
*Attorney, Agent, or Firm*—Norman T. Musial; John R. Manning; James A. Mackin

[57] ABSTRACT

There is disclosed an air inlet for a turbine engine suitable for use on a short takeoff and landing (STOL), a vertical takeoff and landing (VTOL) or a conventional takeoff and landing (CTOL) type of aircraft. A critical region in which critical flow occurs under certain conditions communicates with a less critical region of lower static pressure. Air is drawn away from the critical region and reinjected into the air flow at the less critical region.

In one embodiment a circumferentially extended slot is provided in the inner surface of the air inlet at the windward side and downstream of the throat region. The slot communicates with a circumferential plenum chamber formed in the front of the air inlet just behind the lip. Circumferentially extending rows of apertures are provided on the lip establishing two sets of apertures spaced circumferentially away from the slot in opposite directions. The slot removes the boundary layer from the critical portion of the diffuser to minimize or eliminate flow pressure loss or separations resulting from diffusion or turning. The apertures are in a region of low static pressure on the lip of the inlet and serve as a source of suction to cause air flow into the slot.

21 Claims, 5 Drawing Figures

U.S. Patent     May 15, 1979     4,154,256
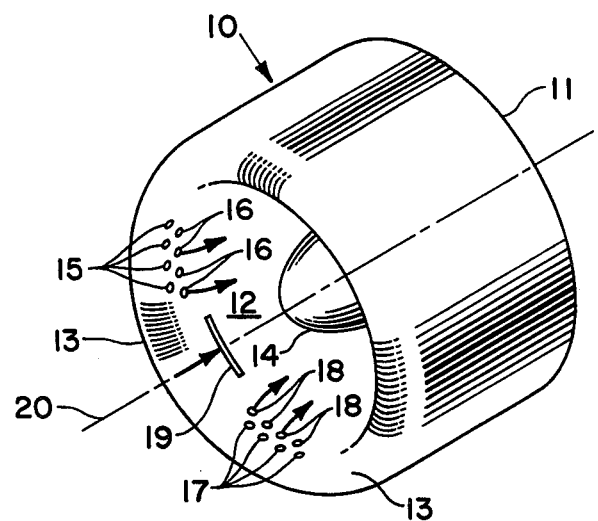
FIG. 1
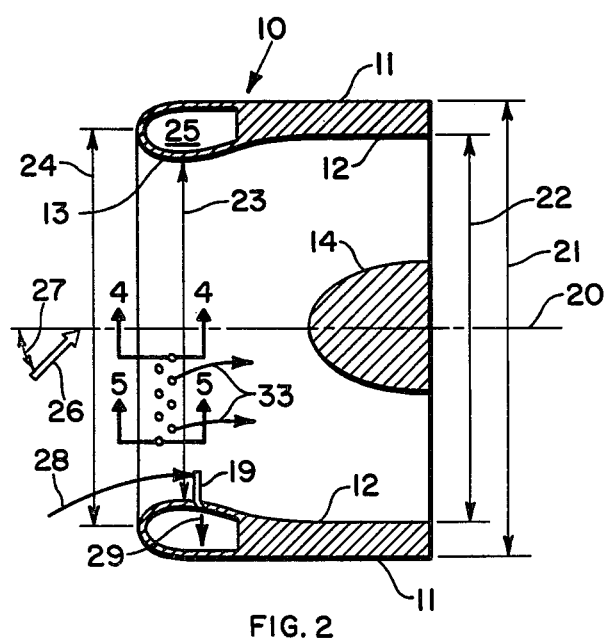
FIG. 2
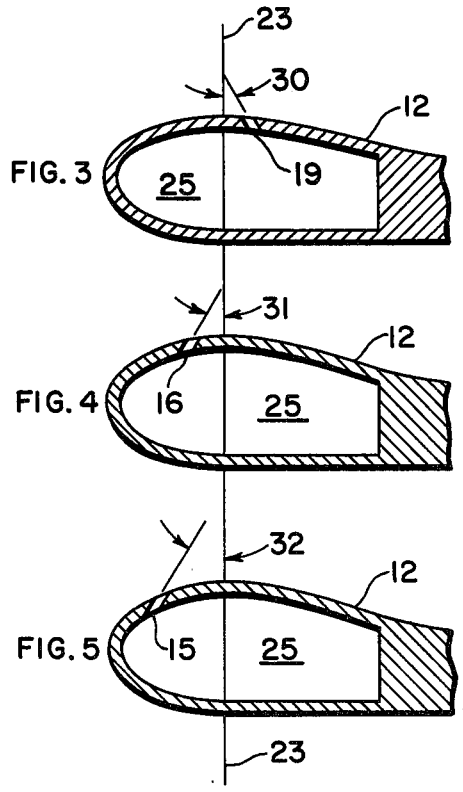
FIG. 3
FIG. 4
FIG. 5

4,154,256

SELF STABILIZING SONIC INLET

ORIGIN OF THE INVENTION

This invention was made by an employee of the U.S. Government and may be manufactured or used by or for the Government of the United States without the payment of any royalties thereon or therefor.

BACKGROUND OF THE INVENTION

This invention relates to air inlets for aircraft turbine engines and is directed more particularly to an air inlet for the turbine engine of a subsonic aircraft.

Boundary-layer bleed systems are known and have been used to improve the performance and control of supersonic inlets where the problems of shock-boundary layer interactions and supersonic diffusion are encountered. The diffusion of supersonic flow has not been usually associated with subsonic inlets. However, supersonic or high Mach number diffusion can arise during subsonic flight if the inlet is subjected to a sufficiently high combination of forward velocity and angle of attack. This causes boundary layer flow separation in the inlet at the windward side with a resultant reduction of pressure recovery and increased distortion of the air flowing from the inlet into the turbine engine. Such situations have been encountered in inlets for VTOL and STOL aircraft in the departure and approach portions of flight. The inlets for highly maneuverable military aircraft may also encounter similar problems.

OBJECTS AND SUMMARY OF THE INVENTION

One object of the invention is to provide a new and novel subsonic air inlet which has high pressure recovery and reduced distortion of its exit air flow to an associated turbine engine under conditions which would normally produce boundary layer flow separation.

It is also an object of the invention to provide means for removing the boundary layer air flow from the critical portion of an air inlet of a turbine engine of a subsonic aircraft and directing it to a less critical region.

It is another object of the invention to provide for an air inlet or diffuser of the foregoing type a bleed system which automatically increases or decreases the amount of boundary-layer control depending upon the magnitude of the differential pressures or adverse pressure gradients that exist within the inlet.

Still another object of the invention is to prove an air inlet wherein boundary layer flow in a critical region at the lower part of the diffuser is removed downstream of the throat region and reinjected into the incoming air flow at the lip of the diffuser in a less critical area.

In summary, the invention comprises a subsonic aircraft air inlet wherein boundary layer flow is removed from the incoming air flow at a critical region of boundary layer flow separation and reinjected at a less critical location where static pressure is lower.

BRIEF DESCRIPTION OF THE DRAWINGS

FIG. 1 is an oblique, top view of an air inlet diffuser embodying the invention.

FIG. 2 is an axial section of the air inlet diffuser of FIG. 1 taken in a vertical plane.

FIG. 3 is an enlarged view of the lower forward portion of the axial section shown in FIG. 2.

FIG. 4 is a cross sectional view of the front portion of the air inlet diffuser of FIG. 1 taken along the line 4—4.

FIG. 5 is a cross sectional view of the frontal portion of the air inlet of FIG. 1 taken along the line 5—5.

DESCRIPTION OF A PREFERRED EMBODIMENT

Many subsonic aircraft utilize air inlets such as scoops on the fuselage to divert air to engines within the aircraft body. Such scoops may or may not have a throat. However, just as for wing mounted air inlets, there will be conditions wherein air flow into the inlet will be at such an angle as to cause boundary layer flow separation.

In accordance with the instant invention, a primary aperture such as a slot is provided in the inner surface of the scoop at the critical region. The slot is generally perpendicular to the air flow at the critical region and is connected by a conduit to a secondary aperture at a region of lower static pressure. The lower pressure creates a suction which draws air into the primary aperture to prevent boundary layer separation flow.

The secondary aperture may comprise a plurality of apertures forming one or more rows generally perpendicular to the air flow direction at the region of lower static pressure.

Referring now to FIG. 1, there is shown a particular air inlet 10 for use with a gas turbine engine of a subsonic aircraft. The inlet shown is of annular configuration and has an outer surface 11, an inner surface 12, and an annular lip 13. However, the inlet is not necessarily annular or axisymmetric. It may have one or more flat sides by way of example.

A spinner 14 of the turbine engine (not shown) is positioned coaxially, as shown in the air inlet 10. A first set of apertures comprising front row apertures 15 and back row apertures 16 are disposed at the lip 13 of inlet 10. Similarly, a second set of apertures comprising front row apertures 17 and rear row apertures 18 are disposed on the lip 13 of the diffuser 10, as shown. Each set of apertures, considered as a set, is displaced circumferentially away from a boundary layer removal slot 19 located in the inner surface 12 of inlet 10 at the bottom. The slot 19 and the apertures 15, 16, 17 and 18 all communicate with a circumferential plenum chamber behind the lip 13 of the diffuser 10 but not visible in FIG. 1.

With the inlet 10 mounted at the front of an aircraft turbine engine, the boundary layer removal slot 19 extends preferably, but not essentially, an equal distance on each side of a vertical plane passing through the axis 20 of the diffuser 10. Likewise, the sets of apertures are circumferentially spaced equal distances from such a vertical plane.

As shown in FIG. 1, the back rows of apertures 16 and 18 are staggered with relationship to the respective front rows 15 and 17. The number of apertures may be varied and the front row may include more apertures than the back row of vice-versa. The end apertures of each set closest to a vertical plane through axis 20 are circumferentially spaced away from the ends of slot 19 at a sufficient distance to minimize any recirculation of air flow between the slot 19 and the sets of apertures.

FIG. 2 is an axial section of the diffuser shown in FIG. 1 taken on a vertical plane through the axis 20 and like parts are identified by like numerals. The outside diameter of the diffuser 10 is indicated by the dimension arrows 21 while the diameter of the inside surface 12 is shown by the dimension arrows 22. A minimum diameter of the diffuser 10 is indicated by a dimension arrows 23 which lie on a plane perpendicular to the axis 20. This forms a throat just to the rear of the lip 13 of the diffuser 10. The diameter of the diffuser at its extreme leading edge is indicated by the dimension arrows 24.

Immediately behind the forward edge of the inlet 10 is a circumferential plenum chamber 25 formed in the inlet. The sets of apertures 15, 16 and 17,18 open directly into the plenum chamber 25 and, therefore, are in direct communication with the boundary layer removal slot 19 which also opens into the plenum chamber 25.

As discussed previously, problems of boundary layer flow are not usually considered to be a problem in subsonic air inlets. However, on STOL and VTOL aircraft, boundary layer flow problems do occur for various combinations of forward velocity and angles of attack. In FIG. 2, an arrow 26 indicates an angle of attack 27 wherein air flow enters the diffuser 10 in the direction of arrow 26.

With the high angle of attack shown by angle 27, and particularly if the angle of attack is greater than 40°, there tends to be boundary layer flow separation in the lower portion of the air inlet diffuser 10. However, with the structure shown in FIG. 2, air flow into the lower portion of the diffuser 10 follows a path, as indicated by the arrow 29 flowing into the boundary layer removal slot 19. The air then flows into the plenum chamber 25, as indicated by arrow 29, and circulates to the apertures 15,16 and 17,18. This air flow is then reinjected into the incoming air through the apertures 15,16 and 17,18 as indicated by the arrows 33.

The sets of apertures 15,16 and 17,18 are located at a low pressure region on the lip 13 forward of the plane of the throat which coincides with dimension arrows 23. The apertures 15,16 and 17,18 effectively provide suction for the plenum chamber 25 and draw the air of the lower portion of the inlet into the boundary layer suction slot 19.

The sets of apertures comprising apertures 15,16 and 17,18 are circumferentially displaced away from a slot 19 to minimize or essentially prevent the recirculation of any air from the apertures back into the slot 19. Further, the rows of apertures 15 and the rows of apertures 17 are staggered, as shown, with relation to the rows 16 and 18, respectively, to minimize the local recirculation of air between the rows and to provide for more rapid mixing of the flow exiting the apertures with the incoming air.

As shown in FIG. 2, the slot 19 is located to the rear or downstream of the plane of the air inlet throat which plane coincides with the dimension arrows 23. This is more clearly shown in FIG. 3 which is an enlarged view of the lip, throat, and plenum shown in the lower part of FIG. 2. As shown in FIG. 3, although not required for the invention, it has been found that performance is improved if the sides of slot 19 are parallel and sloped forward, as shown, making an angle 30 with the plane of the diffuser throat represented by the line 23. This angle is preferably between 30° and 45° although it should be understood that the sidewalls of the slot may be parallel to the plane represented by line 23.

FIG. 4 is a cross-section taken along the line 4—4 of FIG. 2. As shown, the axis of aperture 16 makes an angle 31 with a line 23 representing the plane of the throat. Aperture 16 slopes to the rear at an angle which is preferably between 30° and 45° although, as in the case of the slot 19, the sides of aperture 16 may be parallel to line 23. While only one aperture 16 is shown in FIG. 4, the drawing and explanation apply to all back row apertures 16 and, further, apply to back row apertures 18 on the opposite side of the diffuser 10.

FIG. 5 is a cross-sectional view taken along the line 5—5 of FIG. 2 and shows a front row aperture 15, the axis of which makes an angle 32 with the plane of the throat as represented by line 23. As with the aperture 16 of FIG. 4, the angle 32 is preferably between 30° and 45° and may be less than 30° down to 0°. The drawing of FIG. 5 also applies to the apertures 17 of the other aperture set.

From the foregoing, it is seen that there is provided an air inlet for a turbine engine of a subsonic aircraft wherein, at high angles of attack, the boundary layer air flow is removed from a critical region and reinjected into the air flow at one or more less critical regions of lower pressure. The particular air inlet described is self-stabilizing in that at low angles of attack there is minimum air flow into the slot 19 and out of the apertures 15,16 and 17,18. At high angles of attack, combined with high forward velocity, there is greatly improved pressure recovery as compared to prior art subsonic air inlets. Additonally, air flowing from the inlet into the turbine engine has greatly reduced distortion.

It will be understood that those skilled in the art may make changes and modifications to the foregoing described subsonic air inlet without departing from the spirit and scope of the invention, as set forth in the claims appended hereto.

What is claimed is:

1. An air inlet for an aircraft turbine engine, said inlet being an annular body having inner and outer annular surfaces with an annular lip at its foreward end and a throat downstream of said lip, the minimum diameter of said throat lying on a plane perpendicular to the axis of said inlet diffuser, the improvement comprising:
   a circumferential plenum chamber formed in said diffuser around said throat;
   a primary aperture formed in said inner annular surface downstream of the plane of said throat at the windward side of said inlet in communication with said plenum chamber; and
   at least one secondary aperture in said inner annular surface upstream of the plane of said throat in communication with said plenum chamber and displaced circumferentially from said primary aperture.

2. The inlet of claim 1 and having another secondary aperture in said inner annular wall upstream of the plane of said throat in communciation with said plenum chamber and displaced circumferentially from said slot in a direction opposite from said at least one aperture.

3. The inlet of claim 1 wherein said at least one secondary aperture and said another aperture each comprise a circumferentially extending row of apertures.

4. The inlet of claim 3 and including a second row of circumferentially extending apertures aft of each circumferentially extending row of apertures.

5. The inlet of claim 4 wherein the apertures of said second rows are staggered in relation to those of said circumferentially extending rows.

6. The inlet of claim 4 wherein said primary aperture is a circumferentially extending slot.

7. The inlet of claim 6 wherein said slot has a foreward wall and an aft wall, said walls being sloped in a forward direction with respect to the plane of said throat.

8. The inlet of claim 1 wherein said primary aperture has a forward wall and an aft wall, said walls being sloped in a forward direction with respect to the plane of said throat.

9. The inlet of claim 8 wherein said walls of said primary aperture make an angle of between 30° and 45° with the plane of said throat.

10. The inlet of claim 1 wherein said primary aperture is a circumferentially extending slot.

11. The inlet of claim 1 wherein said at least one secondary aperture is a circumferentially extending slot.

12. The inlet of claim 2 wherein said at least one secondary aperture is circular and wherein an axis perpendicular to the aperture slopes rearward with respect to the plane of said throat.

13. The inlet of claim 12 wherein said at least one aperture and said another secondary aperture each comprise first and second circumferentially extending parallel rows of apertures wherein axis perpendicular to the apertures slope rearwardly with respect to the plane of said throat.

14. The inlet of claim 13 wherein the axis of said apertures make an angle of between 30° and 45° with the plane of said throat.

15. The inlet of claim 14 wherein the apertures of said first and second rows are staggered with respect to each other.

16. An air inlet for a turbine engine of a subsonic aircraft wherein boundary layer flow separation occurs at a critical region in the inlet under certain conditions of forward velocity and angle of attack, the improvement comprising:

primary aperture means at said critical region in said inlet;

secondary aperture means at a region of substantially lower static pressure than said critical region; and conduit means connecting said primary and secondary apertures whereby boundary layer flow is drawn from said primary aperture and reinjected into air flowing into said inlet at a less critical region during conditions in which boundary layer flow separation would otherwise occur in said critical region.

17. The air inlet of claim 16 wherein said primary aperture means is a slot generally perpendicular to the direction of air flow at said critical region.

18. The air inlet of claim 16 wherein said secondary aperture means comprises a plurality of apertures.

19. The air inlet of claim 18 wherein said plurality of apertures comprise at least one row disposed generally perpendicular to the direction of air flow at said less critical region.

20. The air inlet of claim 19 wherein said plurality of apertures comprises at least two parallel rows generally perpendicular to the direction of air flow at said less critical region, the apertures of each row being staggered with respect to the apertures of an adjacent row.

21. The air inlet of claim 16 and including a throat, said primary aperture means being downstream of said throat and said secondary aperture means being upstream of said throat.

* * * * *